United States Patent [19]

Tagawa et al.

[11] Patent Number: 4,563,056
[45] Date of Patent: * Jan. 7, 1986

[54] OPTICAL SYSTEM FOR LASER PRINTER

[75] Inventors: Takao Tagawa, Kashihara; Toshio Urakawa, Yamatokoriyama, both of Japan

[73] Assignee: Sharp Kabushiki Kaisha, Osaka, Japan

[*] Notice: The portion of the term of this patent subsequent to Mar. 6, 2001 has been disclaimed.

[21] Appl. No.: 396,828

[22] Filed: Jul. 9, 1982

[30] Foreign Application Priority Data

Jul. 28, 1981 [JP] Japan ................................ 56-118766

[51] Int. Cl.$^4$ .............................................. G02B 27/17
[52] U.S. Cl. ................................................... 350/6.8
[58] Field of Search ................................. 350/6.8, 255

[56] References Cited

U.S. PATENT DOCUMENTS

| | | | |
|---|---|---|---|
| 2,428,719 | 10/1947 | Nemeth | 350/255 |
| 3,946,150 | 3/1976 | Grafton | 178/6.7 R |
| 3,995,110 | 11/1976 | Starkweather | 350/6.8 |
| 4,034,408 | 7/1977 | Starkweather | 358/293 |
| 4,040,096 | 8/1977 | Starkweather | 358/302 |
| 4,084,197 | 4/1978 | Starkweather | 358/300 |
| 4,213,157 | 7/1980 | DeBenedictis et al. | 358/293 |
| 4,253,724 | 3/1981 | Minoura et al. | 350/6.8 |
| 4,435,733 | 3/1984 | Tagawa et al. | 358/302 |

Primary Examiner—John K. Corbin
Assistant Examiner—Rebecca D. Gass
Attorney, Agent, or Firm—Birch, Stewart, Kolasch & Birch

[57] ABSTRACT

An optical system adapted for a laser printer is characterized in that a laser generator provides a laser beam having a cross section of an ellipse whose longitudinal axis is defined by a surface of the laser generator for emitting the laser beam, a first lens receives and passes through the laser beam having the elliptic cross section toward a lower reflector, a second lens receives the laser beam having the elliptic cross section such that a laser element of the laser beam along with a direction orthogonal to the surface of the laser generator is incident upon a longitudinal side of the second lens and images the laser beam having a cross section of an approximate circle to a substantially focused spot at a surface of a light sensitive medium. The optical system is to focus the first lens by rotation with screws formed on a body tube. Preferably, the first lens comprises a focus lens of an axial symmetrical lens including a spherical lens and the second lens comprises a cylindrical lens.

8 Claims, 7 Drawing Figures

OPTICAL SYSTEM FOR LASER PRINTER

BACKGROUND OF THE INVENTION

The present invention relates to a flying spot scanning system for communicating video information to a scanned medium, and more particularly to an optical system for a scanning system comprising a rotating polyhedron mirror for controlling a scanning laser beam.

Recently, improved recording devices, the so-called "laser printers" have been gaining popularity and have been meeting with commercial success. The major performance of "laser printers" is that visual data such as letters and pictures etc. derived from a computer, a word processor, and a facsimile device etc. are imparted to a scanned medium in the form of an electrostatic charge pattern. A laser beam functions as scanning light.

An example of the "laser printers" is desclosed in Starkweather, U.S. Pat. No. 4,034,408 issued July 5, 1977, entitled "Flying Spot Scanner". The disclosure of this patent is incorporated herein by reference.

However, in the conventional laser printers, a He-Ne gas laser is provided in which case any acousto-optical modulator is needed for modulating a laser beam in conformance with video signal information as disclosed in U.S. Pat. No. 4,034,408. The provision of the acousto-optical modulator resulted in loss of the laser beam when a laser device with a high intensity laser beam is needed.

To eliminate the need for such a modulator, a conventional laser printer comprising a semiconductor laser diode has been investigated. The conventional laser printer requires a colimeter lens, a beam expander lens and an f-θ characteristics imaging lens (f: focal lengh θ: inclination angle) which are very costly to thereby make the laser printer expensive and to prevent practicability of this printer.

Thus, it is desired to develop at practicable cost laser printers comprising the semiconductor laser diodes.

Further, in the above conventional laser printer, a complicated adjustment is needed to adjust the lens, especially, in the beam expander lens. That is because the beam expander lens is composed of a cylindrical lens and the longitudinal side of the cylindrical lens must be kept a constant angle against the horizontal plane. Therefore, to adjust the beam expander lens, the beam expander lens must not be rotated to move the lens.

In addition, adjustment of the distance between the respective lenses in the conventional optical system is rather complicated.

Therefore, it is further desired to develop an improved optical system for a laser printer in which adjustment of the lenses involved therein is simple.

SUMMARY OF THE INVENTION

Accordingly, it is an object of the present invention to provide an improved laser printer comprising a semiconductor laser diode.

It is another object of the present invention to provide an improved optical system for a flying spot scanning system suitable for a laser printer comprising a semiconductor laser diode.

It is a further object of the present invention to provide an improved optical system for adjusting the distance between the respective lenses used for a laser printer comprising a semiconductor laser diode.

Brief described, in accordance with the present invention, an optical system adapted for a laser printer is characterized in that a laser generator provides a laser beam having a cross section of an ellipse whose longitudinal axis is defined by a surface of the laser generator for emitting the laser beam, a first lens receives and passes through the laser beam having the elliptic cross section toward a laser reflector, a second lens receives the laser beam having the elliptic cross section such that a laser element of the laser beam along with a direction orthogonal to the surface of the laser generator is incident upon a longitudinal side of the second lens and images the laser beam having a cross section of an approximate circle to a substantially focuses spot at a surface of a light sensitive medium.

The optical system functions to focus the first lens by rotation with screws formed on a body tube.

Preferably, the first lens comprises a focus lens of an axial symmetrical lens including a spherical lens and the second lens comprises a cylindrical lens.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
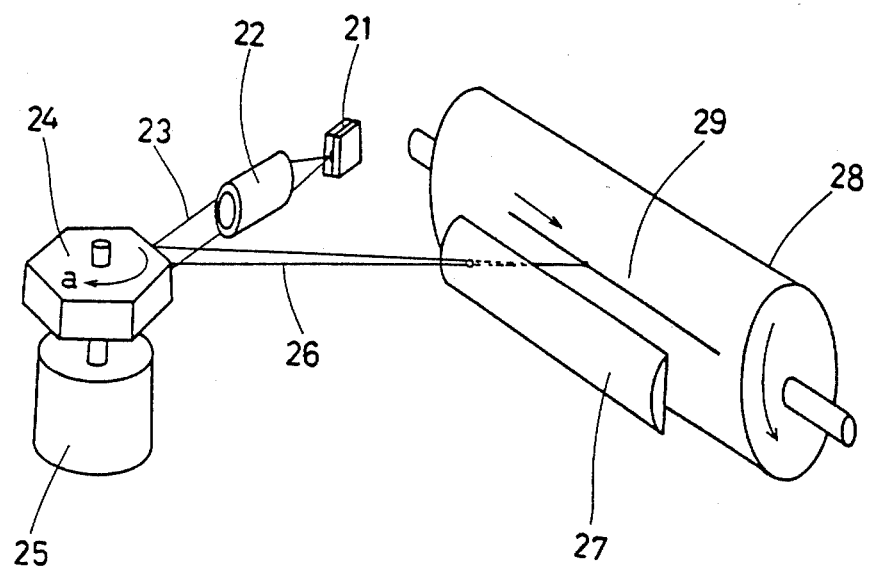
FIG. 1 shows a flying spot scanning system according to the present invention.

With reference to FIG. 1, a flying spot scanning system comprises a semiconductor laser diode 21, a focus (convergence) lens 22, a polyhedron mirror 24, a motor 25, a cylindrical lens 27, and a scanned medium 28.

The scanned medium 28 may be a xerographic drum which rotates consecutively through a charging station depicted by a corona discharge device. The laser beam from the rotating polyhedron mirror 24 traverses a scan width on the drum 28. Usable images are provided in that the information content of the scanning spot is represented by the modulated or variant intensity of laser beam respective to its position within the scan width. The scanned spot dissipates the electrostatic charge in accordance with its laser intensity.

When the laser diode 21 is turned on and off to modulate the laser beam according to the video signal information to be recorded, the presence and absence of the scanned spot forms a pattern in conformance with the video signal information.

The electrostatic charge pattern thus produced is developed in a developing station and then transferred to the final copy paper. In this manner, the information content of the scanned spot is recorded on a more permanent and useful medium. Of course, alternative prior art techniques may be employed to cooperate with a scanned spot in order to utilize the information contained therein.

The polyhedron mirror 24 is continuously driven by the motor 25 and synchronized in rotation to a synchronization signal representative of the scan rate used to obtain the original video signal. The rotation rate of the xerographic drum 28 determines the spacing of the scan lines. It also may be preferable to synchronize the drum 28 in some manner to the signal source to maintain image linearity. The source image is reproduced in accordance with the signal and is transferred to printout paper for use of storage.

Thus, the flying spot scanning system can be adapted for the so-called laser printer.

The semiconductor laser diode 21 may be selected to be a laser diode having a circular laser emission portion within about 2–3 μm. Such a laser diode can be a double heterojunction GaAs-GaAlAs diode (DH type) having an emission portion of about 3 μm or a buried heterojunction diode (DH type).

Figure 2:
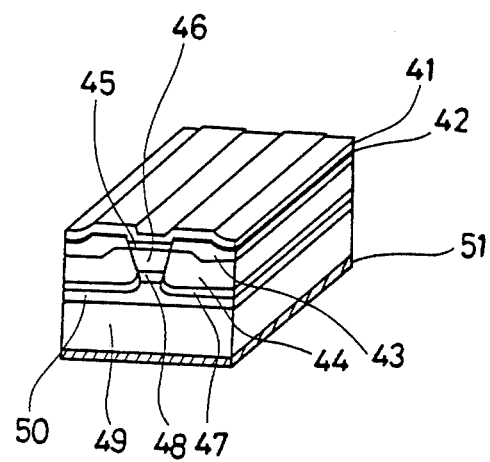
FIG. 2 shows an example of a DH type laser diode adapted for the flying spot scanning system as shown as in FIG. 1.

FIG. 2 shows an example of the DH type laser diode. The DH type laser diode is that an InP layer is provided for burying the both sides of a double heterojunction, the InP having a refraction index lower than of an InGaAsP layer as an active layer. The laser emission region is limited to enable an oscillation of a transversal single mode.

The laser diode of FIG. 2 comprises a Cr/Au layer 41, an SiO$_2$ layer 42, an N-type InGaGsP layer 43, an N-type InP layer 44, a P-type InGaAsP cap layer 45, a P-type InP clud layer 46, a P-type InP block layer 47, an InGaAsP active layer 48, an N-type InP substrate 49, an N-type InP buffer layer 50, and a Cr/Au layer 51.

Since the width of the active layer for providing the oscillation of the transversal single mode is very limited, an emission point is narrowed and becomes similar to a complete circle.

The beam emitted from the laser diode 21 focuses with the focus lens 22 to form an impinging light beam 23. The beam 23 is reflected by the polyhedron mirror 24 rapidly driven by the motor 25 in a direction denoted as a around a central axis. A reflected beam 26 is applied to the scanned medium 28 through the cylindrical lens 27 to form a scanning line 29.

Figure 3:
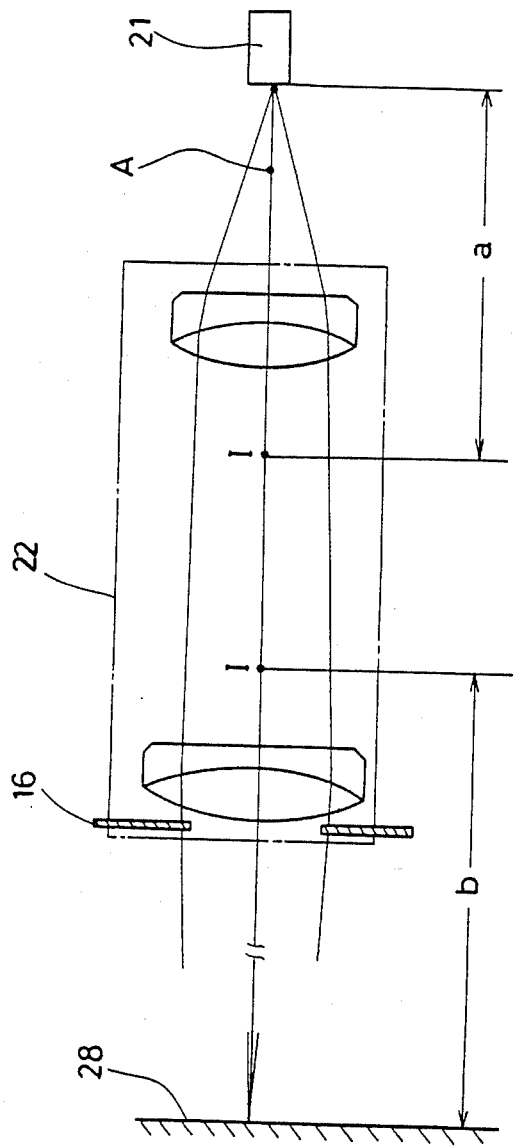
FIG. 3 shows a configuration of a focus (convergence) lens adapted for the system as shown in FIG. 1.

FIG. 3 shows a configuration of the focus lens 22 comprising a combination of a pair of concave-convex lenses in axial symmetry, preferably, spherical lenses. The laser emission surface of the laser diode 21 is placed outside a focus, referred to as A in FIG. 3, of the focus lens 22 and the emission point of the laser 21 focuses on the scanned medium by the following condition:

$$1/a + 1/b = 1/f$$

where a : the distance between the diode 21 and the focus lens 22 b : the light-path distance between the lens 22 and the scanned medium 28 f : the focus length of the lens 22

Preferably, the focus lens 22 comprises lenses having a large value of a numerical aperture (NA) since it can transfer as large a beam amount as possible from the diode 21.

However, as the NA value becomes larger, the focus length becomes shorter to make a magnification of the lens system larger. Then, the spot on the medium 28 becomes larger. When the pupil diameter of the lens system is large, the beam diameter at the polyhedron mirror is also large to shorten the beam amount reaching the medium 28. When the beam diameter is larger than the width of one of the polyhedron mirrors, the laser beam may impinge upon other portions except the mirrors to thereby cause random reflection and halation on a recorded image.

Therefore, the diameter of a pupil 16 is preferably similar to the width of the polyhedron mirror 24. As the width of the mirror 24 is large, the weight thereof is also larger so as to be made an accurate control of the mirror 24 difficult. Then, the pupil diameter of the lens system is preferably about 10 mm.

The NA value of the focus lens 22 is about 0.15 or more. Preferably, it is about 0.25. The focus length of the lens 22 is preferably about 10–30 mm. Below about 10 mm, the magnification of the lens system becomes large to reduce resolution of an image to be formed on the scanned medium 28. Above about 30 mm, the distance between the lens 22 and the laser diode 21 is long to make the NA value small so that a beam amount to be used is reduced as well as the recording speed.

In the focus lens, a scanning position y is defined depending on a rotation angle $\theta$ as follows:

$$y = f \tan \theta$$

As the laser beam nears to the periphery of the scanned medium 28, scanning speed increases to cause a distortion aberration. To amend this aberration, speed of clock signals applied to the laser diode 21 is different between the scanning laser beam incident upon the center of the scanning line 29 and the laser beam incident upon the periphery of the line 29. For recording the periphery of the line 29, the speed of the clock signal is rapid but for recording the center of the line 29, the speed of the clock signals is slow.

It is ideal to continuously change the clock speed from the center of the line 29 to the periphery of the line 29. But, a step-wise change containing 3–5 steps is in practice to obtain a good recorded picture. To change the clock speed, a buffer memory can be provided in the laser printer for storing information for at least a single line when continual information is applied to the laser printer in a predetermined rate. Then, the information generated from the buffer memory can be varied to be transferred into the laser diode.

The polyhedron mirror 24 comprises a plurality of mirrored surfaces for reflecting any illuminating light beam impinging upon them. The width of each of the mirrored surfaces is about 10 mm as an example. Although it is preferable, it is unnecessary to use such an accurate-tilt angle mirrored surface of the polyhedron mirror 24, according to the present invention, with the help of the cylindrical lens 27.

The tilt angle means parallelism between the rotating axis of the polyhedron mirror 24 and the respective mirrored surfaces. When the tilt angle of the respective mirrored surfaces is the same, no problem appears. But, when the tilt angle of the respective mirrored surfaces is different from each other, critical problems appear.

According to the present invention, the critical problems owing to the inaccurate-tile angle mirrored surface of the polyhedron mirror 24 can be solved with the provision of the cylindrical lens 27.

Figure 4:
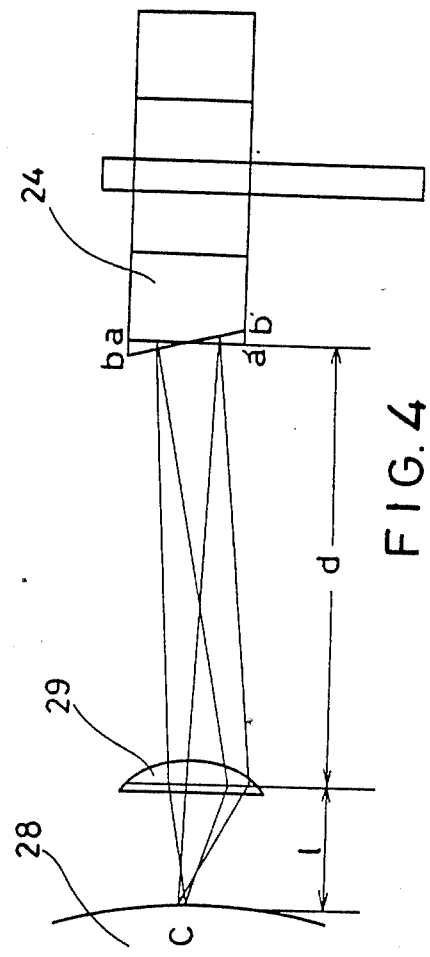
FIG. 4 shows an imaging condition of a laser beam upon a scanned medium according to the present invention.

FIG. 4 shows an imaging condition of the laser beam upon the scanned medium with the help of the cylindrical lens 27. The cylindrical lens 27 has a cross section having no curve in the longitudinal side as shown in FIG. 4.

When the polyhedon mirror 24 rotates with reflecting the impinging laser beams, the laser beams incident upon the scanned medium 28 are not subjected to lens action along with the scanning direction. In a direction orthogonal to the incident direction of the laser beam, namely, to the surface of the drawing of FIG. 4, the lens action is applied to the incident laser beam.

When the laser beams are reflected toward different directions by surfaces a—a' and b—b' of the polyhedron mirror 24, they are focused in a point c by the cylindrical lens 27.

The laser beam orthogonal to the junction surface of the laser diode 21 is incident upon the longitudinal side of the cylindrical lens 27. As stated in FIG. 4, the cylindrical lens 27 comprises a plano-convex lens. The flat surface of the cylindrical lens 27 faces the scattered medium 28. The cylindrical lens 27 is separated from the medium 28 in a distance, preferably, about 15 mm similar to the focus length of the lens 27, preferably, about 15 mm.

The laser diode 21 emits the laser beam having a cross section of an ellipse where the longitudinal axis extends in a direction parallel to the junction surface of the diode. When such a laser beam passes through the axial symmetrical, focus lens 22, the focused spot also forms an ellipse.

As the cylindrical lens 27 is positioned, the following equation is satisfied in FIG. 4.

$$1/l + 1/d = 1/f$$

where
f: the focus length of the cylindrical lens 27
d: the length between the flat surfaces of the lens 27 and the mirrored surfaces of the polyhedron mirror 24
l: the length between the flat surface of the lens 27 and the surface of the medium 28
When $l << d$, $l \approx f$ is needed to amend the tilt angle difference.

Assuming that the focus length of the cylindrical lens 27 is less than 25 mm and $l \approx f$ is selected, the spot on the medium 28 is changed to be an approximate circle by compression with the help of the cylindrical lens 27. This is because the laser diode 21 is positioned so as to emit the laser beam having a cross section of the ellipse if the cylindrical lens 27 is not positioned. As the focus length of the lens 27 is small, the compression rate increases. However, it is preferably 7.5 mm or more in view of lens manufacture difficulty and the size of the scanned spot.

When the focus length of the lens 27 is more than 25 mm, a focusing effect along with the lontidutinal axis of the ellipse is not enough although the scanning error owing to the tilt angle difference can be amended with the condition of $l \approx f$.

Preferably, the focus length of the focus lens 22 is about 20 mm, the NA value of the lens 22 is about 0.25, and the focus length f of the cylindrical lens 27 is about 15 mm.

As described above, in accordance with the present invention, the laser diode 22 is positioned so that the laser element in a direction orghogonal to the junction surface of the laser diode 21 is incident upon the longitudinal side of the cylindrical lens 27. Even when the tilt angle of the respective mirror surfaces of the polyhedron mirror 24 is different from each other, the spot shape upon the medium 28 can be amended to be an approximate circle. The lens system involved comprises an axial symmetrical lens only. Then, the flying spot scanning system of the present invention is not expensive. Even when a tilting axis up to about 0.01° is present in the polyhedron mirror 24, it can be amended. The image resolution is not reduced.

Preferably, the cylindrical lens 27 has a convex shape in both sides, a plano-convex shape or the like. The convex lens in both sides is superior to the plano-convex lens in connection with capability. But, the plano-convex lens can be manufactured more easilier and cheaper. When the flat side of the plano-convex lens faces the medium 28 and the convex side focus rotating polyhedron mirror 24, the plano-convex lens can provide the same capability as the convex lens in both sides.

Because the convex side faces the polyhedron mirror 24, any reflected laser beam from the convex side can be scattered not to return the laser diode 21 so that the laser diode 21 can be stably operated.

According to the present invention, a nonpoint light imaging accompanied by the provision of the semiconductor laser diode can be removed. No additional means is required for amending a nonpoint light source with the laser diode to a light beam having a circular cross section.

The focus lens 22 functions to focus the laser beams emitted. The focus lens 22 comprises the combination of a plurality of axial symmetrical lenses, preferably, spherical lenses as stated with FIG. 3. The plurality of axial symmetrical lenses are positioned within a body tube.

Figure 5:
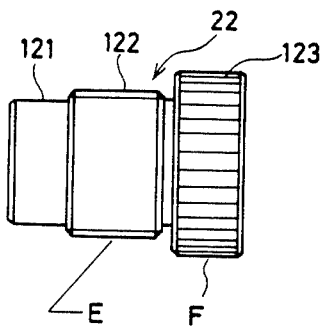
FIG. 5 shows a side view of a housing containing the focus lens as shown in FIG. 3.

FIG. 5 shows a side view of a housing containing the focus lens 22. The housing comprises a body tube 121 and a handle 123. A plurality of male screws 122 each having a short pitch are formed on an outside E of the body tube 121. The handle 123 is handled to install the housing in a lens system. Around the handle 123, knurls are formed.

Figure 6:
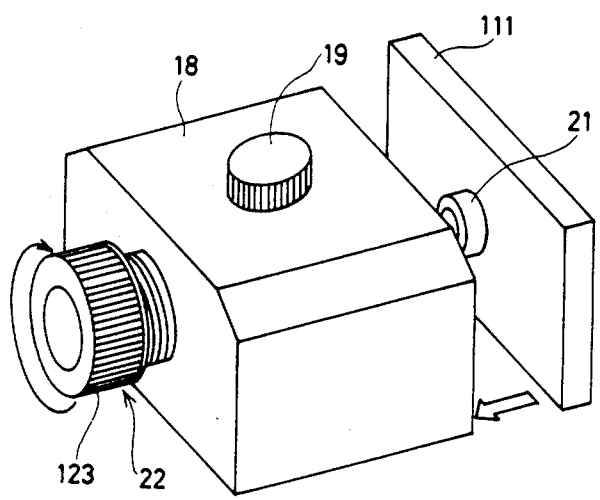
FIG. 6 shows a perspective view of a holder containing the DH type laser diode and the focus lens.
Figure 7:
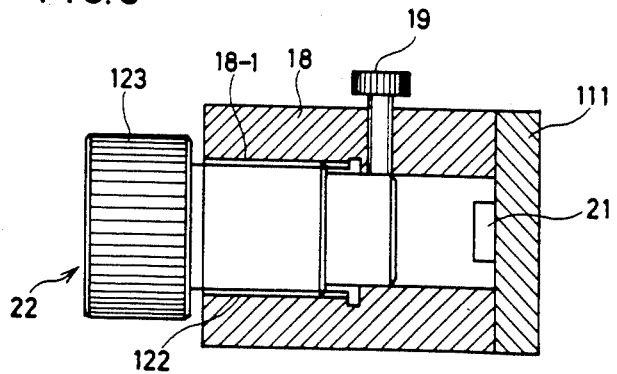
FIG. 7 shows a cross sectional view of the holder as shown in FIG. 6.

FIG. 6 shows a perspective view of a lens holder containing the DH type laser diode 21 and the focus lens 22. FIG. 7 shows a cross sectional view of the lens holder of FIG. 6.

The housing containing the focus lens 22 is screwed into a lens holder 18 since the male screws 122 of the focus lens 22 can be fitted with female screws 18-1 having the same diameters and pitches as those of the male screws 122. The female screws 18-1 are formed inside the lens holder 18. Then, the housing is held by the lens holder 18.

In the lens holder 18, the semiconductor laser diode 21 is positioned to confront the focus lens 22. The diode 21 is fixed on a plate 111. The plate 111 is positioned opposite to the focus lens 22 in the lens holder 18. The plate 111 is positioned in the lens holder 18 such that the lens center axis of the focus lens 22 reaches the laser-emission point of the laser diode 21.

While the handle 123 is handled, the body tube 121 of the focus lens 22 is rotated around its central axis to adjust the relative distance between the focus lens 22 and the laser diode 21 such that the laser beam can be focused on the scanned medium 28 as a beam spot. After this adjustment is completed, the focus lens 22 is fixed with a fixing screw 19 in the lens holder 18.

As described above, the focus lens 22 comprises the combination of the axial symmetric lenses such as the spherical lenses. Therefore, the adjustment of focusing the laser beam on the scanned medium 28 can be enabled by rotating the focus lens 22 around its lens central axis using the screws around the lens 22, which is very simple.

While only certain embodiments of the present invention have been described, it will be apparent to those skilled in the art that various changes and modifications may be made therein without departing from the spirit and scope of the invention as claimed.

What is claimed is:

1. An optical system adapted for an apparatus for recording the information content of an electrical signal on the surface of a light sensitive medium by means of a plurality of scan traces across said medium, comprising:
   source means for providing a light beam of high intensity modulated in accordance with electrical information supplied thereto;
   reflector means having a plurality of contiguous reflective faces rotatable about a central axis;
   rotation means for rotating said reflector means about said central axis;
   focus lens means, disposed between said source means and said reflector means, for receiving and transmitting said light-beam emitted from said source means, said focus lens means including adjustment means for focusing the light beam on the light sensitive medium as a beam spot by rotating the focus lens means around its lens central axis; and
   cylindrical lens means disposed between said reflector means and said light sensitive medium, for receiving and focusing said light beam to a substantially focused spot having a cross section of an approximate circle at the surface of said light sensitive medium.

2. The system of claim 1, wherein the focus lens means comprises an axial symmetrical lens.

3. The system of claim 2, wherein the axial symmetrical lens is a spherical lens.

4. The optical system of claim 1 wherein the focus lens means includes a lens holder and a focus lens, said focus lens being in screw engagement with said lens holder.

5. The optical system of claim 4 wherein the source means for providing a light beam is a laser diode, said laser diode being disposed within the lens holder and positioned therein to confront the focus lens such that the lens center axis of the focus lens reaches the laser-emission point of the laser diode.

6. The optical system of claim 5 wherein the focus lens is rotatable around its central axis to adjust the relative distance between the focus lens and the laser diode such that the laser beam can be focused on the light sensitive medium as a beam spot.

7. The system of claim 6, wherein a fixing screw means is provided in the lens holder to fix the focus lens in position.

8. An optical system adapted for an apparatus for recording the information content of an electrical signal on the surface of a light sensitive medium by means of a plurality of scan traces across said medium comprising:
   source means for providing a light beam of high intensity modulated in accordance with electrical information supplied thereto, said source means providing said light beam having a cross section of an ellipse whose longitudinal axis is defined by a surface of said source means for emitting said light beam;
   reflector means having a plurality of contiguous reflective facets rotatable about a central axis;
   rotation means for rotating said reflector means about said central axis;
   first lens means, disposed between said source means and said reflector means, for receiving and transmitting said light beam emitted from said source means and having the cross section of an ellipse toward said reflector means;
   adjustment means for focusing light beam on the light sensitive medium as a beam spot by rotating the first lens means around its lens central axis; and
   second lens means disposed between said reflector means and said light sensitive medium, for receiving said light beam having the cross section of said ellipse such that a light element of said light beam along with a direction orthogonal to said surface of said source means is incident upon a longitudinal side of said second lens means and for imaging said light beam having a cross section of an approximate circle to a substantially focused spot at the surface of said light sensitive medium.

* * * * *